US008369799B2

(12) United States Patent
Taylor (10) Patent No.: US 8,369,799 B2
(45) Date of Patent: Feb. 5, 2013

(54) APPARATUS, SYSTEMS AND METHODS TO COMMUNICATE RECEIVED COMMANDS FROM A RECEIVING DEVICE TO A MOBILE DEVICE

(75) Inventor: Thomas S. Taylor, Atlanta, GA (US)

(73) Assignee: EchoStar Technologies L.L.C., Englewood, CO (US)

( * ) Notice: Subject to any disclaimer, the term of this patent is extended or adjusted under 35 U.S.C. 154(b) by 995 days.

(21) Appl. No.: 11/924,464

(22) Filed: Oct. 25, 2007

(65) Prior Publication Data
US 2009/0111392 A1    Apr. 30, 2009

(51) Int. Cl.
H04B 1/40 (2006.01)
H04N 7/16 (2006.01)

(52) U.S. Cl. .......... 455/88; 725/1; 725/24; 725/37; 725/86; 725/135

(58) Field of Classification Search ............ 455/88
See application file for complete search history.

(56) References Cited

U.S. PATENT DOCUMENTS

| | | | |
|---|---|---|---|
| 4,852,086 A | 7/1989 | Eastmond et al. | 370/69.1 |
| 5,675,371 A | 10/1997 | Barringer | 348/6 |
| 5,794,144 A | 8/1998 | Comer et al. | 455/426 |
| 5,974,094 A | 10/1999 | Fines et al. | 375/335 |
| 6,044,266 A | 3/2000 | Kato | 455/422 |
| 6,151,491 A | 11/2000 | Farris et al. | 455/412 |
| 6,167,253 A | 12/2000 | Farris et al. | 455/412 |
| 6,493,338 B1 | 12/2002 | Preston et al. | 370/352 |
| 6,665,382 B2 | 12/2003 | Dunn et al. | 379/93.32 |
| 6,665,873 B1* | 12/2003 | Steenbeek et al. | 725/136 |
| 6,741,684 B2 | 5/2004 | Kaars | 379/110.01 |
| 6,750,801 B2* | 6/2004 | Stefanik | 341/176 |
| 6,826,227 B1 | 11/2004 | Duval et al. | 375/240 |
| 7,035,285 B2 | 4/2006 | Holloway et al. | 370/474 |
| 7,058,356 B2 | 6/2006 | Slotznick | 455/3.05 |
| 7,061,885 B2 | 6/2006 | Kurtz | 370/329 |
| 7,069,211 B2 | 6/2006 | Chiu et al. | 704/221 |
| 7,117,001 B2 | 10/2006 | Lin et al. | 455/517 |

(Continued)

FOREIGN PATENT DOCUMENTS

KR    10-0726107 B1    6/2007
WO    01/08441    2/2001

(Continued)

OTHER PUBLICATIONS mobile. (n. d.). The American Heritage® Dictionary of the English Language, Fourth Edition. Dictionary.com website: http://dictionary.reference.com/browse/mobile.*

(Continued)

*Primary Examiner* — Temesgh Ghebretinsae
*Assistant Examiner* — Gennadiy Tsvey
(74) *Attorney, Agent, or Firm* — Seed IP Law Group PLLC (57) ABSTRACT

A receiving device embodiment receives a user command from an external source. The user command is directed to a remote target destination. A first interactive programming command communicator embodiment generates a mobile device command from the received user command, and communicates the mobile device command to a mobile device. A second interactive programming command communicator embodiment receives the mobile device command from the receiving device. A target destination is identified from information in the mobile device command, and information from the mobile device command is communicated to the target destination.

19 Claims, 6 Drawing Sheets

U.S. PATENT DOCUMENTS

| | | | |
|---|---|---|---|
| 7,401,326 B1* | 7/2008 | Durham et al. | 717/139 |
| 7,864,717 B2 | 1/2011 | Dorr | 370/267 |
| 2001/0036828 A1 | 11/2001 | Butler et al. | 455/434 |
| 2001/0049664 A1* | 12/2001 | Kashino et al. | 705/52 |
| 2002/0038210 A1 | 3/2002 | Yajima et al. | 704/230 |
| 2003/0033223 A1* | 2/2003 | Mizuno | 705/27 |
| 2003/0046083 A1 | 3/2003 | Devinney, Jr. et al. | 704/273 |
| 2003/0139933 A1 | 7/2003 | Kimmel | 704/275 |
| 2004/0073915 A1* | 4/2004 | Dureau | 725/9 |
| 2004/0085576 A1* | 5/2004 | Paz-Pujalt et al. | 358/1.15 |
| 2004/0145660 A1* | 7/2004 | Kusaka | 348/211.2 |
| 2004/0181801 A1* | 9/2004 | Hagen et al. | 725/32 |
| 2004/0203374 A1 | 10/2004 | Zilliacus | 455/41.2 |
| 2004/0250273 A1 | 12/2004 | Swix et al. | 725/25 |
| 2005/0278648 A1* | 12/2005 | Taylor | 715/768 |
| 2006/0023852 A1 | 2/2006 | Casey | 379/93.18 |
| 2006/0053436 A1 | 3/2006 | Allwein et al. | 725/1 |
| 2006/0154679 A1 | 7/2006 | Chang | 455/502 |
| 2006/0190966 A1* | 8/2006 | McKissick et al. | 725/61 |
| 2007/0118770 A1* | 5/2007 | Kahn et al. | 713/193 |
| 2007/0169144 A1* | 7/2007 | Chen et al. | 725/30 |
| 2007/0173231 A1 | 7/2007 | Fadell | 455/412.1 |
| 2008/0077950 A1 | 3/2008 | Burke et al. | 725/1 |
| 2008/0125098 A1 | 5/2008 | Bruce et al. | 455/414.1 |
| 2008/0155636 A1* | 6/2008 | Cruz et al. | 725/131 |
| 2008/0196066 A1 | 8/2008 | Matz | 725/62 |
| 2009/0070796 A1 | 3/2009 | Stomakhin et al. | 725/1 |
| 2009/0070886 A1* | 3/2009 | Lecomte et al. | 726/27 |
| 2009/0232139 A1 | 9/2009 | Kelley | 370/392 |
| 2010/0157973 A1 | 6/2010 | Bekiares et al. | 370/350 |

FOREIGN PATENT DOCUMENTS

| | | |
|---|---|---|
| WO | 01/99295 | 12/2001 |
| WO | 2004/039103 | 5/2004 |

OTHER PUBLICATIONS

European Standard, "Digital Video Broadcasting (DVB); Interaction channel through the Global System for Mobile communications (GSM)"; ETSI EN 301 195 V1.1.1, Feb. 1, 1999, pp. 1-14.

Hall, "PocketMail Composer: E-mail Solution for the Road," RV Hometown, Nov./Dec. 2002, URL = http://www.rvhometown.com/HTML/Articles/PocketMail.htm, download date Jan. 28, 2008, 4 pages.

International Search Report, mailed Sep. 22, 2009, for PCT/US2009/038017, 23 pages.

Manne et al., "Systems, Methods and Apparatus for Transmitting Data Over a Voice Channel of a Wireless Telephone Network," U.S. Appl. No. 12/058,935, filed Mar. 31, 2008, 39 pages.

Manne et al., "Systems, Methods and Apparatus for Transmitting Data Over a Voice Channel of a Telephone Network Using Linear Predictive Coding Based Modulation," U.S. Appl. No. 12/058,947, filed Mar. 31, 2008, 41 pages.

Manne et al., "Systems, Methods and Apparatus for Transmitting Data Over a Voice Channel of a Wireless Telephone Network Using Multiple Frequency Shift-Keying Modulation," U.S. Appl. No. 12/058,975, filed Mar. 31, 2008, 40 pages.

\* cited by examiner

APPARATUS, SYSTEMS AND METHODS TO COMMUNICATE RECEIVED COMMANDS FROM A RECEIVING DEVICE TO A MOBILE DEVICE

TECHNICAL FIELD

The technical field relates to systems and methods for program content receiving devices and, more particularly, to apparatus, systems, and methods to communicate received commands from a receiving device to a mobile device.

BRIEF SUMMARY

Apparatus, systems, and methods for communicating programming are disclosed. According to one embodiment, a method includes receiving with a receiving device a user command from an external source, the user command directed to a remote target destination, generating a mobile device command from the received user command, and communicating the mobile device command to a mobile device.

According to another embodiment, a method includes receiving a mobile device command from a receiving device, identifying a target destination from information in the mobile device command, and communicating information from the mobile device command to the target destination.

According to another embodiment, a receiving device operable to communicate with mobile devices includes a programming interface configured to receive programming from a program source, a command receiver configured to receive a user command from an external source, a processing system operable, upon receiving the user command, to construct a mobile device command directed to a remote target destination, and a mobile device interface configured to communicate the mobile device command to a mobile device.

According to yet another embodiment, a mobile device operable to communicate with receiving devices and target destinations includes a receiving device interface configured to receive a mobile device command from a receiving device, a processing system operable to identify a target destination based upon the received mobile device command, and a transceiver configured to communicate information corresponding to the mobile device command to the identified target destination.

BRIEF DESCRIPTION OF THE SEVERAL VIEWS OF THE DRAWINGS

The components in the drawings are not necessarily to scale relative to each other. Like reference numerals designate corresponding parts throughout the several views.

DETAILED DESCRIPTION

Figure 1:
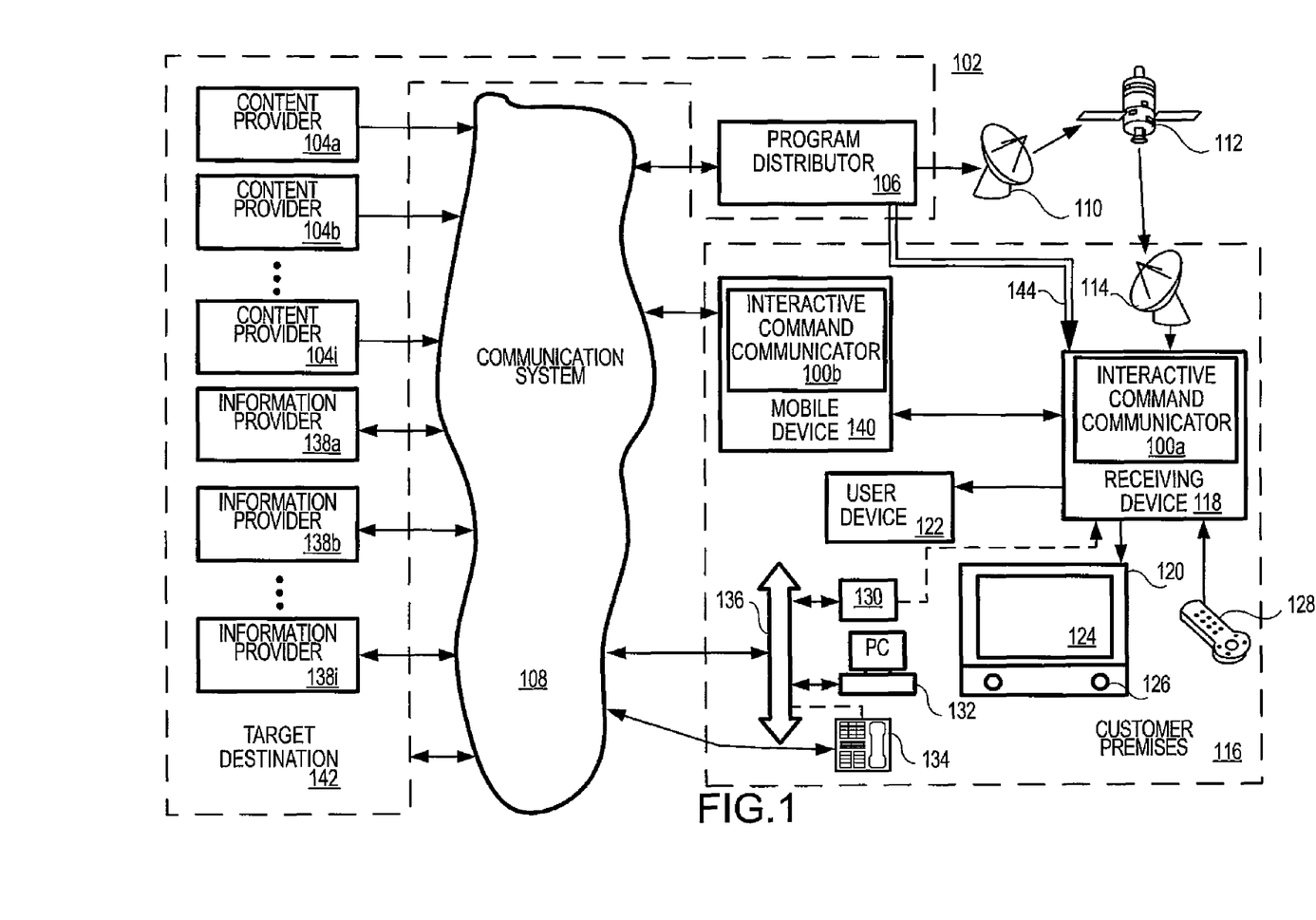
FIG. 1 is an overview block diagram illustrating an exemplary communication network.

FIG. 1 is an overview block diagram illustrating an exemplary communication network 102 in which embodiments of interactive programming command communicators 100a, 100b may be implemented. FIG. 1 is just one example of a communications network 102 and that the various embodiments discussed herein are not limited to this exemplary network.

A first interactive programming command communicator 100a is coupled to a receiving device 118, for example, a set top box or the like. The first interactive programming command communicator 100a may optionally be implemented inside or outside of receiving device 118. The receiving device 118 is configured to receive programming and present the programming to a user. The receiving device 118 is further configured to accept from a user, an input command directed to a remote target destination. The first interactive programming command communicator 100a is configured to generate a mobile device command that corresponds to the input command from the user. The mobile device command is passed via the first interactive programming command communicator 100a to a second interactive programming command communicator 100b.

The second interactive programming command communicator 100b is coupled to a mobile device 140, for example, a mobile phone or the like. The second interactive programming command communicator 100b may be optionally implemented inside or outside of mobile device 140. The second interactive programming command communicator 100b is operable to receive a mobile device command from the first interactive programming command communicator 100a. The second interactive programming command communicator 100b is further operable to process the mobile device command from the first interactive programming command communicator 100a and to transmit a corresponding command to a remote target destination 142. The mobile device command received by interactive programming command communicator 100b may be arranged such that information in the mobile device command is communicable by the mobile device 140 to the target destination 142 with minimal additional processing.

Communication network 102 can include a variety of communication systems and can use a variety of communication media including, but not limited to, satellite wireless media. In one non-limiting example, the communications network 102 may include a land-based cable infrastructure 144. In another non-limiting example, communications network 102 may include an uplink dish 110, a satellite 112, and a downlink dish 114.

Program distributors 106 use communication system 108 to provide their customers with a multitude of audio/video and/or data programming at their premises 116. The programming provided by program distributors 106 may originate from one or more content providers 104a-104i, one or more information providers 138a-138i, and/or from a program distributor 106 itself. The programming is received at the customer premises 116 via a receiving device 118 which may be communicatively coupled to a presentation device 120 configured to receive and present the programming.

Receiving device 118 interconnects to one or more communications media and/or programming delivery systems (such as a cable head-end, satellite antenna, telephone company switch, Ethernet portal, off-air antenna, or the like) that propagate and/or deliver the programming. The receiving device 118 commonly receives a plurality of programming by way of the communications media and/or programming delivery systems. From the plurality of programming, a user may select specific programming to hear, view, and/or otherwise process. Based upon a user's selection, the receiving device 118 processes and communicates the selected programming to one or more presentation devices 120.

Receiving device 118 may be interchangeably referred to by a general device description such as a "television converter," "receiver," "set-top box," "television receiving device," "television receiver," "programming receiver," "television recording device," "satellite set-top box," "satellite receiver," "cable set-top box," "cable receiver," and/or "television tuner." Accordingly, the receiving device 118 may be any suitable converter device or electronic equipment that is operable to receive programming. Further, the receiving device 118 may itself include user interface devices, such as buttons or switches. In many applications, the receiving device 118 (and also the presentation device 120, and/or other user devices 122) may be controlled by a remote device 128 in such a manner as to provide enhanced functionality and/or an enhanced presentation of the programming to a user.

The customer of the programming distributor 106 may be an individual person, a business, or any other entity that subscribes to programming from the program distributor 106. In contrast, a user of the programming (a "user") may be a customer of the program distributor 106, but the user is not necessarily a customer. Thus, it is to be appreciated that a user is any person, electronic device, or other entity that hears, sees, or otherwise processes the programming delivered to the customer premises 116.

The customer premises 116 where the receiving device 118 is located may be a business, home, multiple dwelling unit, or other facility to which the programming is delivered. In many implementations, one or more presentation devices 120 are located in or near a customer's premises 116 and are communicatively coupled directly or indirectly to the receiving device 118.

Examples of a presentation device 120 include, but are not limited to, a television (TV), a personal computer (PC), a sound system receiver, a digital video recorder (DVR), a compact disk (CD) device, a game system, or the like. Presentation devices 120 may employ a display 124, one or more speakers 126, or other output devices to communicate video, audio, and/or data content to a user.

Some customer premises 116 include an optional network 136, or a networked system, to which receiving devices 118, presentation devices 120, and/or a variety of user devices 122 (collectively referred to as endpoint devices), can be coupled. Non-limiting examples of network 136 include, but are not limited to, an Ethernet, twisted pair Ethernet, an intranet, a local area network (LAN) system, or the like. One or more endpoint devices, such as PCs 132, telephonic systems 134, data storage devices, TVs, game systems, sound system receivers, Internet connection devices, digital subscriber loop (DSL) devices, wireless LAN, WiFi, Worldwide Interoperability for Microwave Access (WiMax), or other intermediary devices 130, are communicatively coupled to network 136 so that the plurality of endpoint devices are communicatively coupled together. Thus, the network 136 allows the interconnected endpoint devices, and the receiving device 118, to communicate with each other.

Subscribing customers may receive interactive programming from content providers 104a-104i, information providers 138a-138i, and/or program distributors 106. The interactive programming permits a user to act in response to the interactive programming. For example, the interactive programming may permit a user to respond by communicating via a mobile device 140 back to a target destination 142. The target destination 142 may be any one or group of content providers 104a-104i, information providers 138a-138i, program distributors 106, individuals, or other entities.

Interactive programming, within the context of the various embodiments described herein, is programming that provides a mechanism to invoke a response from a user hearing, viewing, or processing the programming. The response may be immediate or latent. Non-limiting examples of interactive programming are television shows and/or advertising that include an electronic address (e.g. a website, email address, and/or the like), a telephone number, or other means intended to encourage a user to interactively respond. Some examples of interactive programming include, but are not limited to, advertising that offers items or services for sale to users, information services that provide additional information to interested users, and/or competitions that encourage users to cast votes. Another example of interactive programming is any programming perceived by a user who finds the programming compelling enough to want to share with others. Interactive programming is not necessarily identifiable by a single test, but instead is conceptual and may be subjective to those that provide and/or perceive it.

The interactive programming command communicator 100a enables a receiving device 118 to communicatively couple with a mobile device 140 to facilitate a user's response to interactive programming. When a user responds to the interactive programming by issuing a user command directed to a remote target destination, the interactive programming command communicator 100a processes the user command and generates a mobile device command. Upon generating the mobile device command, the interactive programming command communicator 100a communicates the mobile device command to the mobile device 140.

Non-limiting examples of mobile devices 140 are cell phones, personal media players (PMP's), personal digital assistants (PDA's), laptop computers, handheld personal computers (HPC's), and the like. Such mobile devices 140 may permit a user of the mobile device to electronically send, receive, create, edit, and manage information.

Embedded in, or coupled to, a mobile device 140 is an interactive programming command communicator 100b. The interactive programming command communicator 100b is operable to receive a mobile device command from the interactive programming command communicator 100a of receiving device 118. The interactive programming command communicator 100b is further operable to format and/or process the mobile device command for communication by the mobile device 140 to the target destination 142. For example, the interactive programming command communicator 100b may add user and/or routing information, packetize, and/or otherwise process the information in the mobile device command before the mobile device 140 communicates the command to the target destination 142.

Thus, within the context of the various embodiments described herein, a mobile device command is generated by a receiving device 118 when a user issues a user command in response to interactive programming. The generated mobile device command is communicated via the first interactive programming command communicator 100a of the receiving device 118 to the second interactive programming command communicator 100b of the mobile device 140. Upon receipt of the mobile device command, the mobile device 140 processes and sends information as directed by the mobile device command to a target destination 142.

The interactive programming command communicators 100a, 100b may communicatively couple to each other via one or more wireless protocols, for example, but not limited to, Bluetooth, infrared, UHF, or the like. For example, in some embodiments, the mobile device 140 has a Bluetooth radio chipset that is operatively used by interactive programming command communicator 100b to communicate with a corresponding Bluetooth radio chipset used by interactive programming command communicator 100a. In some embodiments, the communicative coupling between interactive programming command communicators 100a, 100b is based on proximity, signal availability, and/or the like.

Alternatively, or additionally, interactive programming command communicators 100a, 100b may communicatively couple to each other via one or more physical mediums and protocols such as, but not limited to, USB, IEEE 1394 (FireWire), Ethernet, twisted pair, and the like. For example, a mobile device 140 may be docked in a cradle coupled to the receiving device 118 via a USB cable. In some embodiments, the communicative coupling between interactive programming command communicators 100a, 100b only occurs when the mobile device 140 is physically coupled to the receiving device 118.

In some embodiments, the mobile device 140 has non-cellular radio chipset. The mobile device 140 may then communicate to the target destination 142 via a medium such as a private radio link, an open format radio link, or another digital and/or analog medium.

In some embodiments, the mobile device 140 has an integrated cellular radio chipset. Thus, communication of a command by the mobile device 140 to the target destination 142 may be via a medium such as, but not limited to, a cellular network, or the like. The cellular radio chipset is configured to facilitate communication of commands over a cellular network or the like.

A cellular network is broadly encompassed within the communication system 108. The cellular network may be any available network suitable for transmitting and receiving data between mobile and/or fixed point devices, or the cellular network may be dedicated to a primary purpose of delivering the information to known cellular subscribers and/or receiving information from known cellular subscribers. Accordingly, cellular subscribers may receive and transmit information between a mobile device 140 and the target destination 142. It is to be appreciated that the cellular network may include both wired and wireless infrastructure; for example, transceivers, repeaters, switches, antennas, access points, routers, public switched telephone networks, codecs, multiplexers, de-multiplexers, and the like.

Figure 2:
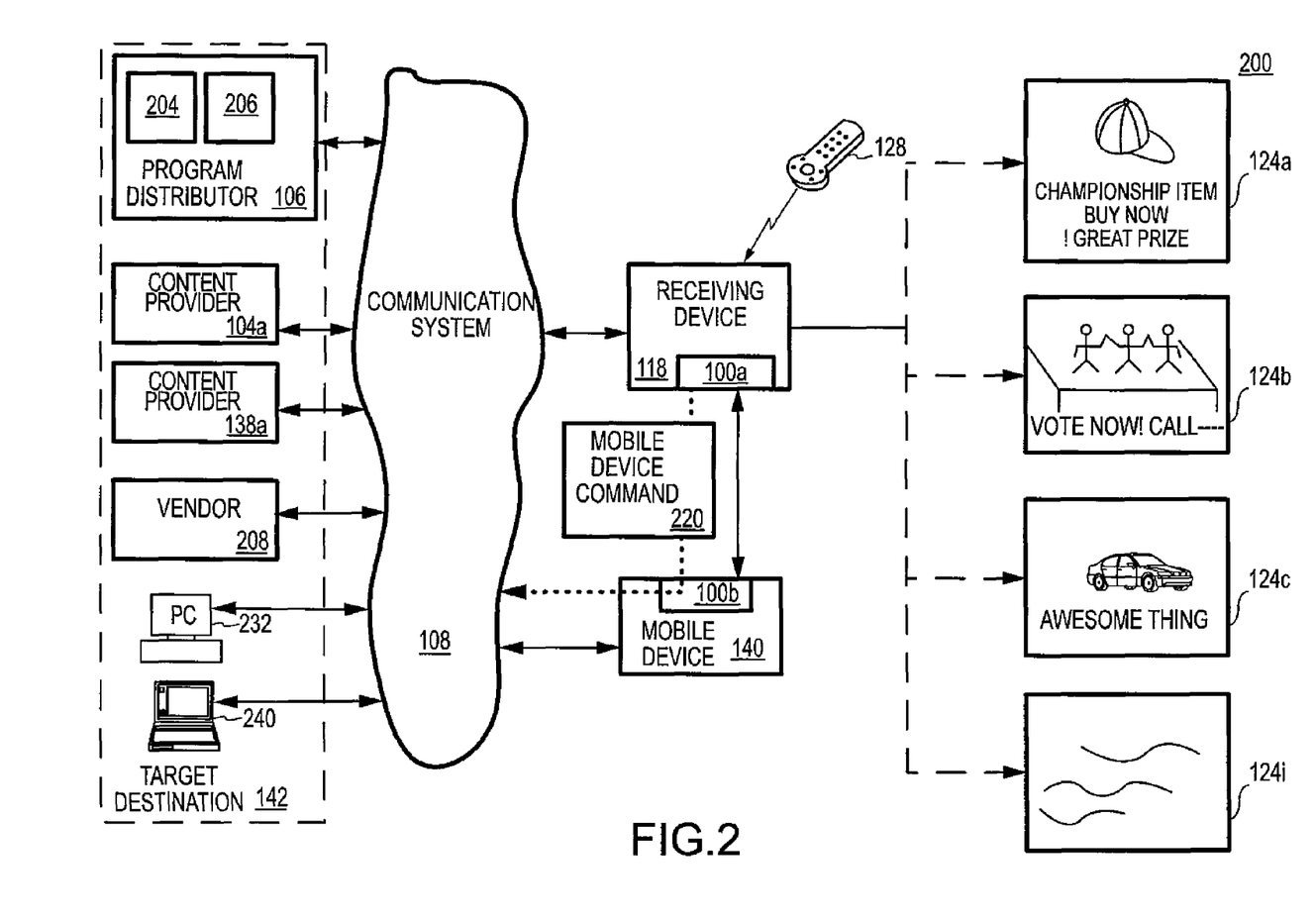
FIG. 2 is a block diagram illustrating embodiments of interactive programming command communicators operating in a programming environment.

FIG. 2 is a block diagram illustrating embodiments of interactive programming command communicators 100a, 100b operating in a programming environment. A user issues interactive programming commands, which are communicated to target destinations 142 via programming communications system 200. Programming communications system 200 is a part of communication system 108 (FIG. 1). In addition to the exemplary target destinations 142 shown in FIG. 2, programming communications system 200 is further operable to communicate a variety of interactive programming and interactive user commands to a variety of target destinations.

As noted above, when program distributors 106 provide users with interactive programming, the interactive programming is communicated to receiving devices 118 via communications systems 108. As illustrated in FIG. 2, a user may affirmatively respond to the interactive programming by inputting a user command into a device communicatively coupled to receiving device 118.

The user's command may be generated by an external source and communicated to the receiving device 118 by the external source. Examples of external sources suitable for generating and communicating user commands include, but are not limited to, a remote control 128, other keyed input devices (not shown), and/or other controllers of the presentation device 120 (FIG. 1) and/or receiving device 118. In some embodiments, a software algorithm system (not shown) may be used wherein a menu or the like is presented to a user. Accordingly, user commands may be generated via the displayed menu system.

When a user command is received by the receiving device 118, the user command is processed into a mobile device command 220. The mobile device command 220 corresponds to the user command instruction intended by the user. The mobile device command 220 is then communicated to a mobile device 140 via the interactive programming command communicators 100a, 100b.

After a mobile device 140 receives a mobile device command 220 via the interactive programming command communicator 100b, the mobile device 140 processes the received mobile device command 220 according to the information contained therein. Generally, the information will direct the mobile device 140 to generate a command and communicate the command to a target destination 142. In some embodiments, the command includes some or all of the information from the received mobile device command 220.

To communicate the command to the target destination 142, the mobile device 140 will initiate a call to the target destination 142. The call may be made immediately, or may be made at a different time. After the call is initiated, the mobile device 140 delivers the command to the target destination 142.

Several examples of interactive programming command communication are now described. These examples are merely non-limiting examples of how user commands may be generated and then communicated through the programming communications system 200.

In a first example, display 124a shows a presentation of interactive programming communicated by program distributor 106 via communication system 108, receiving device 118, and presentation device 120. In this example, a content provider 104a or information provider 138a is advertising an item available for purchase by a user. The item may be any good, service, and/or other vendible available from a vendor. The user is inspired by the interactive programming and enters an order and/or purchase command into the receiving device 118 to cause delivery of the item ordered and/or purchased. The user enters the order and/or purchase command via an external source, for example, a remote control 128.

Upon receiving the user command, the receiving device 118 formats a mobile device command 220 for communication to a mobile device 140. The receiving device 118 communicatively couples with the mobile device 140 for communication via interactive programming command communicators 100a, 100b. The mobile device command 220 is communicated from interactive programming command communicator 100a to interactive programming command communicator 100b such that the mobile device command 220 is received by the mobile device 140.

The mobile device 140 processes the mobile device command 220 according to the order and/or purchase information therein and generates a message command for a target destination 142. In the example discussed, the user has commanded an order and/or purchase, and the target destination 142 is the program distributor 106. Thus, the mobile device 140 communicates a message command to the program distributor 106.

The program distributor 106, upon receiving the message from the mobile device 140, formats and sends an interactive programming command order 204 to a vendor 208 of the goods or services desired by the user. In some variations of this example, the message command from the mobile device 140 may go directly to the vendor 208 without further interaction with the program distributor 106. In some embodiments, the program distributor 106 provides the goods or services to the user directly without sending a programming command order 204 to another vendor 208. Namely, in some cases, the vendor is the program distributor 106, and in some cases, the vendor is some other entity.

In some embodiments, the program distributor 106 may prepare an interactive programming command invoice 206 for communication back to the user. The program distributor 106 may generate programming command invoice 206 based on personal user information 314*a* (FIG. 3) communicated in the mobile device command or communicated in the formatted message from the mobile device 140. Alternatively, or in addition, the program distributor 106 may generate programming command invoice 206 based on information known about the customer of the program distributor 106.

In another example, display 124*b* shows a presentation of interactive programming communicated by a program distributor 106 via communications system 108 and receiving device 118. In this example, a content provider 104*a* or information provider 138*a* is presenting a series of performances and encouraging users to vote for their favorite. A user inspired by the interactive programming may be able to vote by entering a vote command with an external source into the receiving device 118.

In some non-limiting embodiments, particular performers may be assigned a particular telephone number and a user may cast a favorable vote by calling the assigned telephone number. In other non-limiting embodiments, a particular code or web site may be assigned to each performance, and a user may be encouraged to transmit the assigned code or visit the assigned website to cast a favorable vote.

Upon receiving the user's vote command, the receiving device 118 formats a mobile device command 220 for communication to a mobile device 140. The receiving device 118 communicatively couples with the mobile device 140 for communication via interactive programming command communicators 100*a*, 100*b*. The mobile device command 220 is communicated from interactive programming command communicator 100*a* to interactive programming command communicator 100*b* such that the mobile device command 220 is received by the mobile device 140.

The mobile device 140 processes the mobile device command 220, according to the voting information therein. Subsequently, the mobile device 140 generates a message command and communicates the message command to a target destination 142. In this example, the user voted for a performance, and the target destination 142 may be one or more of a content provider 104*a*, an information provider 138*a*, or some other entity (not shown).

In some embodiments, the mobile device program logic 410 (FIG. 4) is operative such that the mobile device 140 may process the mobile device command 220 in enhanced ways that are useful to the user. That is, in some embodiments, the user's vote command is communicated one time, and in other embodiments, the user's vote command may be communicated multiple times. In some embodiments, if the target destination 142 is unavailable, the mobile device 140 will automatically and/or manually direct message communication retries at one or more later times.

In another example, display 124*c* shows a presentation of interactive programming communicated by a program distributor 106 via communications system 108 and receiving device 118. In this example, a program distributor 106, content provider 104*a*, or information provider 138*a* is presenting programming that a user finds interesting. The user is inspired by the programming and wants to share the experience with someone else.

Accordingly, the user enters a command with an external source into the receiving device 118. In this example, the command may be formatted using other features of the receiving device 118 such as "forward," "rewind," "cut," and "paste," and so may include a clip of the programming attached as a still picture or video. Alternatively, or in addition, the command may include a text message written by the user. Thus, the command embodies the user's desire to send a peer-to-peer message to another person and/or device through the receiving device 118 and mobile device 140.

Non-limiting embodiments of peer-to-peer messages may include electronic messages communicated by one party to another, e.g., an electronic message from the user to one or more other persons and/or devices. The electronic messages may be formatted for communication from a mobile device 140 to a remote target destination 142 by any acceptable protocol and/or communications standard including, but not limited to, Short Message Service (SMS) messaging, information message (IM) messaging, instant messaging, electronic mail (email), and/or the like.

Upon receiving the user's peer-to-peer message command, the receiving device 118 generates a mobile device command 220 for communication to a mobile device 140. During generation of the mobile device command 220, various pieces of information may be grouped together to form the mobile device command 220.

In some embodiments, generation of the mobile device command 220 includes identifying an electronic address corresponding to the remote target destination 142. In some embodiments the electronic address may be added to the mobile device command 220 by the user directly or the electronic address may be retrieved from memory. In some embodiments, the electronic address is stored in the receiving device 118, and in some embodiments, the electronic address is stored in the mobile device 140.

In some embodiments, generation of the mobile device command 220 includes adding a user message to the mobile device command 220. For example, a user may type a text message into the user command that will be included in the mobile device command 220, and the text message may be communicated to the remote target destination 142. In some embodiments, pre-stored text phrases or other images may be retrieved from memory in the receiving device 118 and/or the mobile device 140.

In some embodiments, generation of the mobile device command 220 includes adding protocol information to the mobile device command 220 to identify a protocol that may be used to forward the message to the remote target destination 142. For example, the protocol information may direct the mobile device 140 to communicate the message to the remote target destination as an electronic mail message.

In some embodiments, generation of the mobile device command 220 includes adding an image and/or video clip into the mobile device command. The image and/or video clip may be added as data corresponding to the image and/or video clip.

In some embodiments, protocol information may be added to the mobile device command 220 to identify a type of program that may be used to present the image and/or video clip on a presentation device at the remote target destination 142. In one example, image protocol information may direct the mobile device 140 to deliver the message to the remote target destination such that a JPEG format file viewer is used to view the image. In another example, video clip protocol information may direct the mobile device 140 to deliver the message to the remote target destination such that an MPEG format file viewer is used to view the video clip.

In addition to generating the mobile device command 220, which embodies the user's peer to peer message, the receiving device 118 communicatively couples with the mobile device 140 for communication via interactive programming command communicators 100*a*, 100*b*. The mobile device command 220 is communicated from interactive programming command communicator 100*a* to interactive programming command communicator 100*b* such that the mobile device command 220 is received by the mobile device 140.

The mobile device 140 processes the mobile device command 220 according to the peer-to-peer message information therein, and generates a message for a target destination 142. In this example, the user wishes to send a peer-to-peer message, and the target destination 142 may be a content provider 104*a*, an information provider 138*a*, an email account accessible by a computer 232, another mobile device 240, or the like.

It is to be appreciated that the examples described above do not represent the full spectrum of commands that a user may generate in response to presented interactive programming. Other interactive programming may be presented on a display 124*i*, other mobile device commands 220 may be operatively directed by a user, and communication of messages by the mobile device 140 may be made to other target destinations 142.

Figure 3:
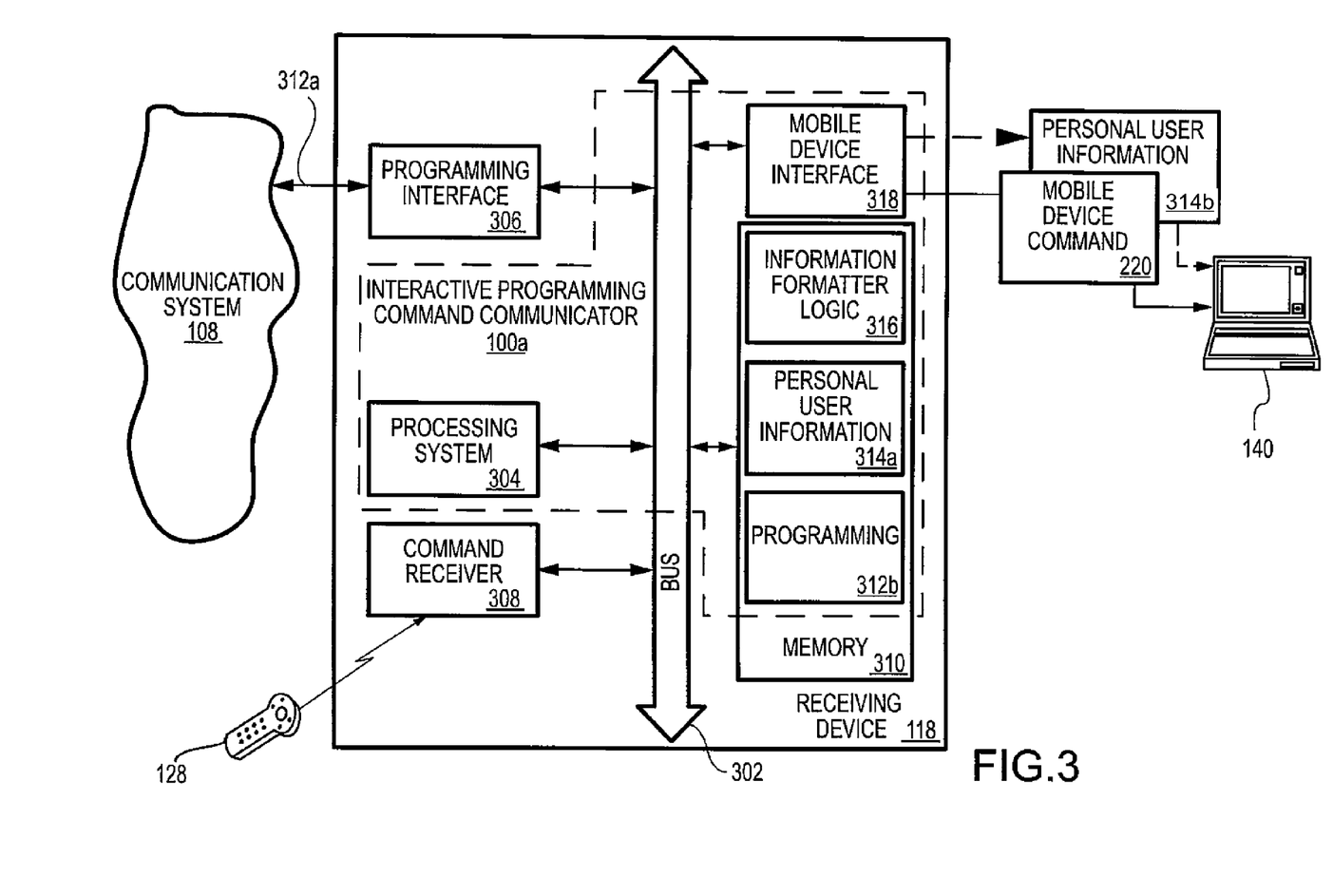
FIG. 3 is a block diagram illustrating a receiving device.

FIG. 3 is a block diagram illustrating a receiving device 118. Receiving device 118 comprises a system bus 302, a processing system 304, an interface 306 for receiving interactive programming 312*a* via a program distributor 106 (FIG. 1), a command receiver 308, and a memory 310. Optionally resident in the memory 310 is interactive programming 312*b*, which may be received from program distributor 106 as interactive programming 312*a* and stored in the memory 310 of receiving device 118. Personal user information 314*a* and information formatter logic 316 may also be optionally resident in the memory 310.

In the exemplary embodiment illustrated in FIG. 3, processing system 304, programming interface 306, command receiver 308, memory 310, and mobile device interface 318 are illustrated as communicatively coupled to each other via system bus 302. System bus 302 thereby provides connectivity between the above-described components. System bus 302 includes any known signal communication architectures. In alternative embodiments of the receiving device 118, the above-described components may be communicatively coupled in a different manner than illustrated in FIG. 3. For example, one or more of the above-described components may be directly coupled to other components, or may be coupled to each other, via intermediary components (not shown). In some embodiments, system bus 302 may be omitted and the components may be coupled directly to each other using suitable connections.

The mobile device interface 318 in the illustrated embodiments is an operational part of the interactive programming command communicator 100*a*. In other embodiments, all or part of the interactive programming command communicator 100*a* and/or the mobile device interface 318 may alternatively be separate from, but coupled to, the receiving device 118.

In the embodiment illustrated in FIG. 3, the interactive programming command communicator 100*a* is embedded in the receiving device 118 and includes one or more components of the receiving device 118, such as the processing system 304, the memory 310, and the mobile device interface 318. It is to be appreciated, however, that other embodiments may couple an external interactive programming command communicator 100*a* to the receiving device 118 instead of embedding the interactive programming command communicator 100*a* to the receiving device 118. In some embodiments, the external interactive programming command communicator 100*a* will share components with the receiving device 118. For example, the processing system 304, the memory 310, and/or the mobile device interface 318 may be integral parts of the receiving device 118 and additionally operable to perform the tasks of the interactive programming command communicator 100*a*.

The processing system 304 includes any known single device, or combination of devices, for operationally controlling the receiving device 118. In some embodiments, the processing system 304 is primarily dedicated to processing a user command and generating a mobile device command 220 for communication to a mobile device 140. In some embodiments, the processing system 304 is primarily dedicated to the main functions of the receiving device 118 (not shown), and the processing system 304 is secondarily used to process a user command and generate a mobile device command 220 for communication to a mobile device 140.

Interactive programming 312*a* is receivable over communication system 108 by the receiving device 118 via the programming interface 306. In some embodiments, the communication of interactive programming 312*a* with the receiving device 118 may be bidirectional.

The command receiver 308 is operable to receive user commands from an external source. The user commands are entered by a user in response to interactive programming 312*a*. FIG. 3 illustrates that command receiver 308 is responsive to user commands that are input from a remote control 128, however, in other embodiments, different external sources may provide user command input to the command receiver 308. For example, key pads, touch screens, software programs, and the like may alternatively or additionally provide user commands to the command receiver 308.

In some embodiments, the external source of user command input to command receiver 308 may be physically separate from receiving device 118. For example, FIG. 3 illustrates a remote control 128 that is physically separate from receiving device 118. In some embodiments, the external source of user command input to command receiver 308 may be an integral part of receiving device 118. For example, in some embodiments, a keypad on the receiving device 118 may provide user command input.

In some non-limiting embodiments, the command receiver 308 is operable to affirmatively acknowledge receipt of the user command input back to the external source. In one non-limiting example, a keypad on the receiving device 118 may be operative to input a user command to the command receiver 308, and the command receiver 308 may provide an audible and/or visual output on the receiving device 118.

Upon receipt of a user command, the processing system 304 works cooperatively with memory 310 and other parts of the receiving device 118 to process the user command. The memory 310 may be any known memory mechanism. Memory 310 may include either volatile or non-volatile storage, or both. Memory 310 may optionally store interactive programming 312*b* received via program distributor 106, personal user information 314*a*, and/or information formatter logic 316.

Interactive programming 312*b* may be received as interactive programming 312*a* via the programming interface 306 or some other means (e.g., a memory card, a direct link to another electronic device, etc.). Interactive programming 312a, 312b may be communicated to the receiving device 118 via program distributor 106.

Personal user information 314a is information useful to uniquely identify a user of programming that originates from a program distributor 106. Personal user information 314a may optionally include, but is not limited to, additional information about the user such as physical addresses, credit account information, and/or billing account information.

In some embodiments, information formatter logic 316 may be used by processing system 304 to direct the generation of the mobile device command 220. In some embodiments, information formatter logic 316 may be cooperatively used by processing system 304 to direct the communication of the mobile device command 220 to the mobile device 140 via mobile device interface 318.

The mobile device interface 318 is optionally part of the interactive programming command communicator 100a. The interactive programming command communicator 100a may include, but is not limited to, the mobile device interface 318 and/or other hardware and software logic used to communicate input command information to computers, telephones, and other user devices.

A non-limiting example is now presented where a user command may be processed by the exemplary embodiment of a receiving device 118 illustrated in FIG. 3. In this example, interactive programming 312a is communicated by program distributor 106 over communication system 108 and received via programming interface 306. Interactive programming 312a may be stored in memory 310 as interactive programming 312b. When interactive programming 312b is subsequently presented on a presentation device 120 (FIG. 1), a particular action may be suggested in the interactive programming 312b. If a user of interactive programming 312b is inspired to take an action suggested in interactive programming 312b, the user may enter a user command via remote control 128.

The command receiver 308 may receive the user command from the remote control 128, and the interactive programming command communicator 100a may analyze the user command with processing system 304. Working cooperatively with the memory 310, the processing system 304 may generate a mobile device command 220 as directed by information formatter logic 316.

In some embodiments, some or all of the personal user information 314a stored in receiving device 118 may be embedded in the mobile device command 220 as personal user information 314b. In some embodiments, no personal user information 314a, 314b is embedded in mobile device command 220.

The interactive programming command communicator 100a may then communicate the mobile device command 220 to a mobile device 140 via the mobile device interface 318. The mobile device 140 may then further process the received mobile device command 220 and communicate information therein to a target destination 142.

Figure 4:
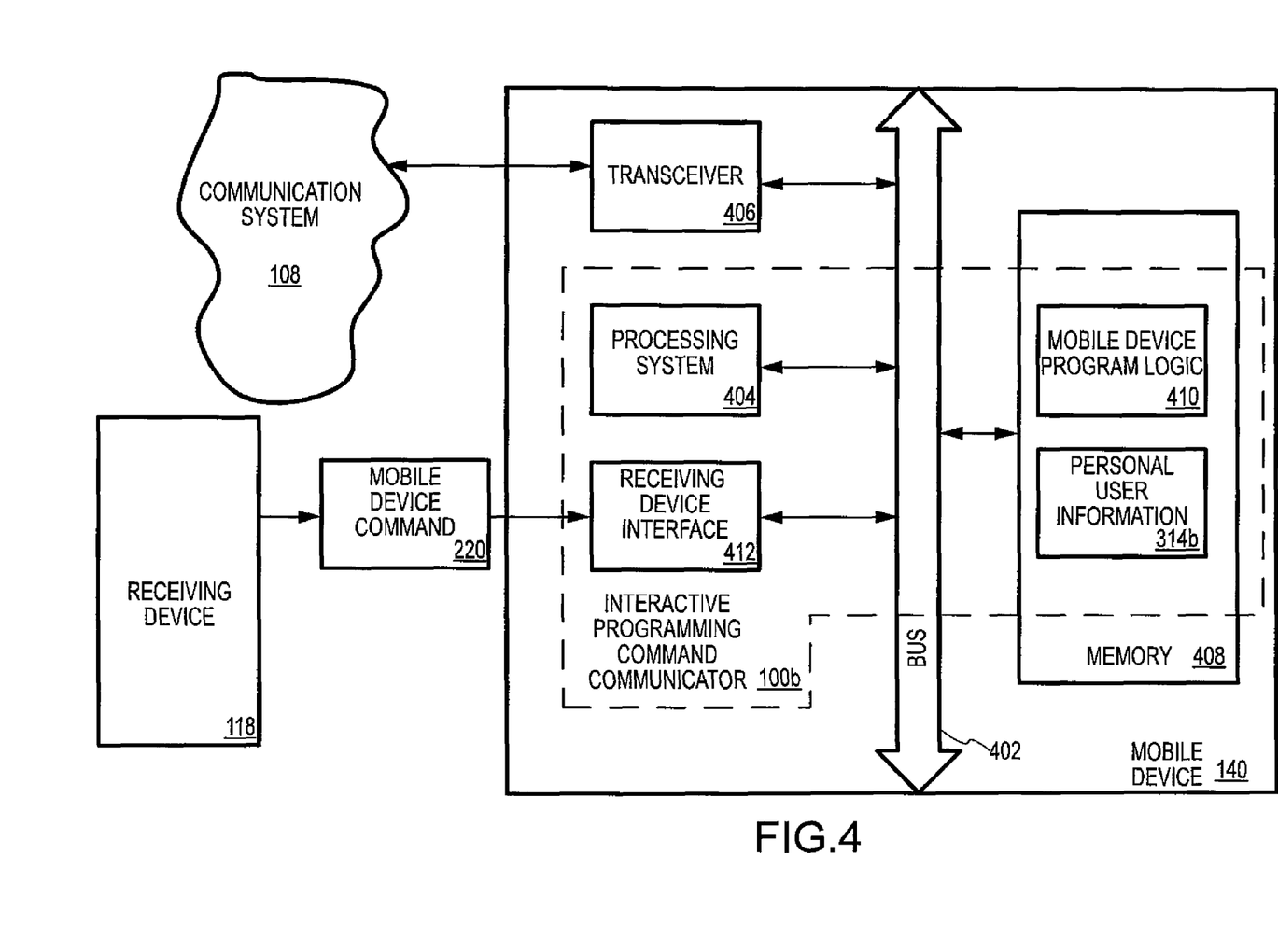
FIG. 4 is a block diagram illustrating a mobile device.

FIG. 4 is a block diagram illustrating a mobile device 140. Mobile device 140 comprises a system bus 402, a processing system 404, a transceiver 406, and a memory 408. Resident in the memory 408 is mobile device program logic 410. Optionally resident in the memory 408 is personal user information 314b.

In one embodiment illustrated in FIG. 4, processing system 404, transceiver 406, memory 408, and receiving device interface 412 are illustrated as communicatively coupled to each other via system bus 402, thereby providing connectivity between the above-described components. System bus 402 includes any known signal communication architectures. In alternative embodiments of the mobile device 140, the above-described components may be communicatively coupled in a different manner than illustrated in FIG. 4. For example, one or more of the above-described components may be directly coupled to other components, or may be coupled to each other, via intermediary components (not shown). In some embodiments, system bus 402 may be omitted and the components may be coupled directly to each other using suitable connections.

In the embodiment of FIG. 4, a receiving device interface 412 is an integral part of the interactive programming command communicator 100b, and interactive programming command communicator 100b is an integral part of mobile device 140. It is to be appreciated that in alternate embodiments, all or part of the interactive programming command communicator 100b and/or receiving device interface 412 may alternatively be separate from, but coupled to, the mobile device 140.

In the embodiment illustrated in FIG. 4, the interactive programming command communicator 100b is embedded in the mobile device 140 and includes one or more components of the mobile device 140 such as the processing system 404, the memory 408, and the receiving device interface 412. It is to be appreciated that other embodiments may couple an external interactive programming command communicator 100b to the mobile device 140 instead of embedding the interactive programming command communicator 100b to the mobile device 140. In some embodiments, the interactive programming command communicator 100b will share components with the mobile device 140. For example, the processing system 404, the memory 408, and/or the receiving device interface 412.

The processing system 404 includes any known single device, or combination of devices, for operationally controlling the mobile device 140. In some embodiments, the primary purpose of processing system 404 is dedicated to process a mobile device command 220 and to generate a message command for communication to a remote target device 142. In some embodiments, the primary purpose of processing system 404 is for other functions of the mobile device 140 (not shown), and a secondary purpose of the processing system 404 is to process a mobile device command 220 and generate a message command for communication to a remote target device 142.

Mobile communications may be executed in a known manner via the transceiver 406 through communications systems 108. In some non-limiting embodiments, the transceiver 406 may have a cellular radio chipset (not shown). In some non-limiting embodiments, mobile communications may be conducted via a commercially available cell phone 140 over a commercially available cellular network. In other embodiments, the cell phone 140 and cellular network may be customized for communication of interactive programming commands.

The interactive programming command communicator 100b is operable to receive a mobile device command 220 with the receiving device interface 412. In FIG. 4, an embodiment of a mobile device 140 is shown to receive a mobile device command 220 from a receiving device 118.

In other embodiments, a mobile device command 220 may also be accepted by the interactive programming command communicator 100b from other sources. For example, mobile device commands 220 may be received from sources that include, but are not limited to, an input keypad (not shown), a memory card (not shown), or a programmed command received via the communications transceiver 406.

In some embodiments, the interactive programming command communicator 100b is operable to affirmatively acknowledge a mobile device command 220. For example, in some embodiments, after a mobile device command 220 is received, the interactive programming command communicator 100b may acknowledge receipt of the mobile device command 220 by communicating a message back to the source of the mobile device command 220. In some embodiments, interactive programming command communicator 100b may output an audio, visual, or other indicator to acknowledge receipt of the mobile device command.

The interactive programming command communicator 100b receives the mobile device command 220 via the receiving device interface 412. The interactive programming command communicator 100b may process the mobile device command 220 with the processing system 404, which works cooperatively with memory 408 and other parts of the mobile device 140.

In some embodiments, the processing system 404 may retrieve personal user information 314b from memory 408 as part of the processing of the mobile device command 220. Personal user information 314b is information useful to uniquely identify a user of programming received by receiving device 118. Personal user information 314b may include, but is not limited to, information about the user such as physical addresses, credit account information, and/or billing account information. In some embodiments, the personal user information 314b includes all or part of the personal user information 314a of FIG. 3. Personal user information 314b may be received in a mobile device command 220 or may be received by some other manner including, but not limited to, an input keypad (not shown), a memory card (not shown), or an information packet received via the communications transceiver 406.

Mobile device program logic 410 is used by the processing system 404 and/or the receiving device interface 412 to process the information within a mobile device command 220. For example, in some embodiments, a mobile device command 220 may represent a user command to purchase an item. Thus, the mobile device logic 410 may be used by the processing system 404 and/or the receiving device interface 412 to generate a purchasing message command for communication to a remote target destination 142 (FIG. 1). In another non-limiting example, a mobile device command 220 may represent a user command to cast a vote. Accordingly, mobile device logic 410 may be used by the processing system 404 and/or the receiving device interface 412 to place a call to a particular telephone number associated with a remote target destination 142.

The mobile device program logic 410 may include features that enhance a user's interactive experience. In one example, a command entered by the user may be communicated via the mobile device one time or multiple times. In another example, the mobile device program logic 410 may integrate common mobile device features such as call-retry-on-busy, call-forwarding, and call-block, etc. into the handling of the mobile device command 220.

The receiving device interface 412 is optionally part of the interactive programming command communicator 100b. The interactive programming command communicator 100b may include the receiving device interface 412, the processing system 404, memory 408, and/or other hardware and software logic (not shown) used to act on and/or receive a mobile device command 220.

An example is now presented where a mobile device command 220 may be processed by the exemplary embodiment of the mobile device 140 illustrated in FIG. 4. In this example, a mobile device command 220 is generated when a user of interactive programming 312a, 312b (FIG. 3) takes an action suggested in the programming 312a, 312b. Via the remote control 128 (FIG. 1), the user may enter a user command, and the receiving device 118 may generate and communicate a corresponding mobile device command 220 to the mobile device 140.

The mobile device command 220 may be received at the mobile device 140 with the interactive programming command communicator 100b via receiving device interface 412. The processing system 404 may begin to process the mobile device command 220. Working cooperatively with the memory 408, the processing system 404 may act according to the information in the mobile device command 220, and the processing system 404 may initiate a call to a target destination 142 (FIG. 1). Subsequently, the mobile device 140 may then communicate a message command via transceiver 406 and communication system 108 to the target destination 142.

Figure 5:
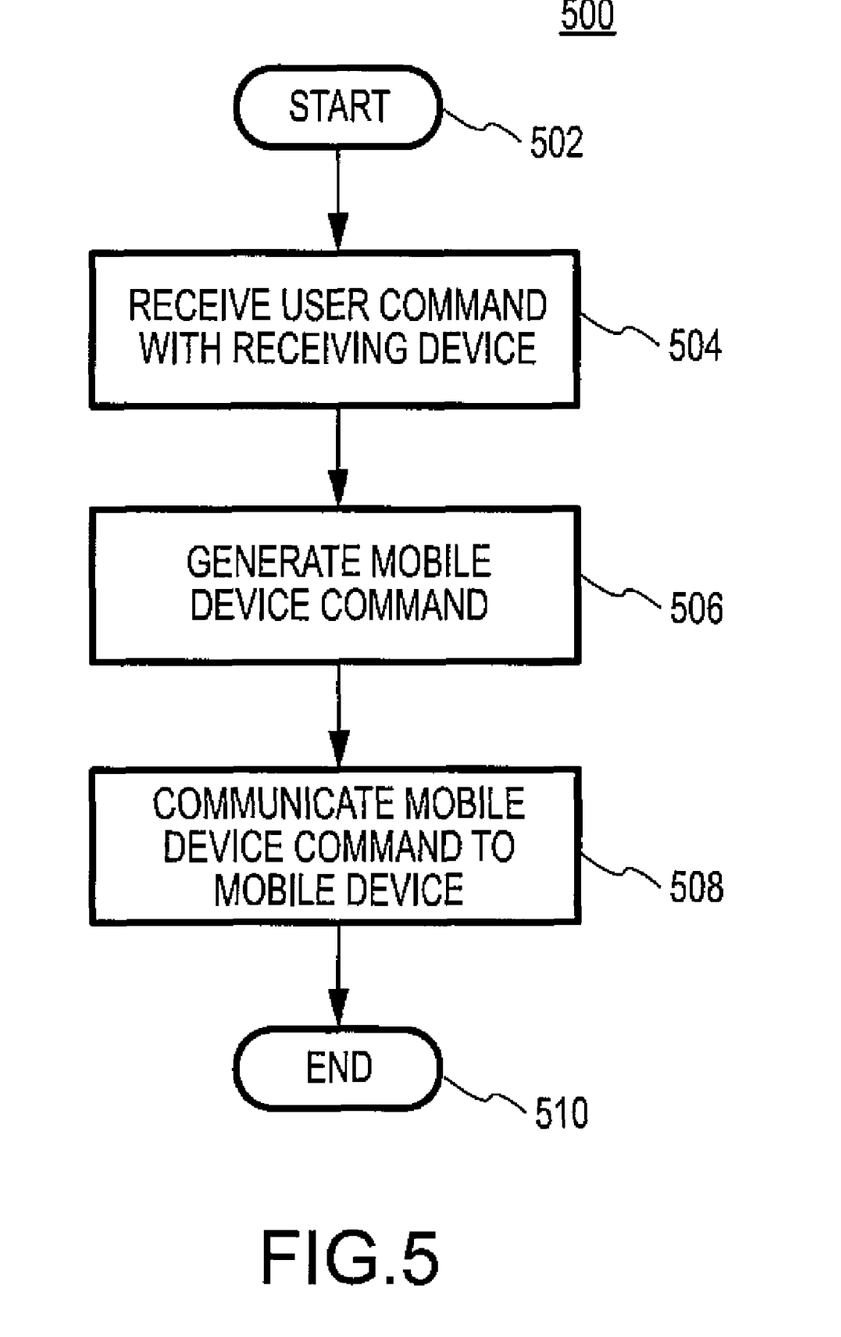
FIG. 5 is a flowchart illustrating a process used by an embodiment of an interactive programming command communicator of a receiving device.
Figure 6:
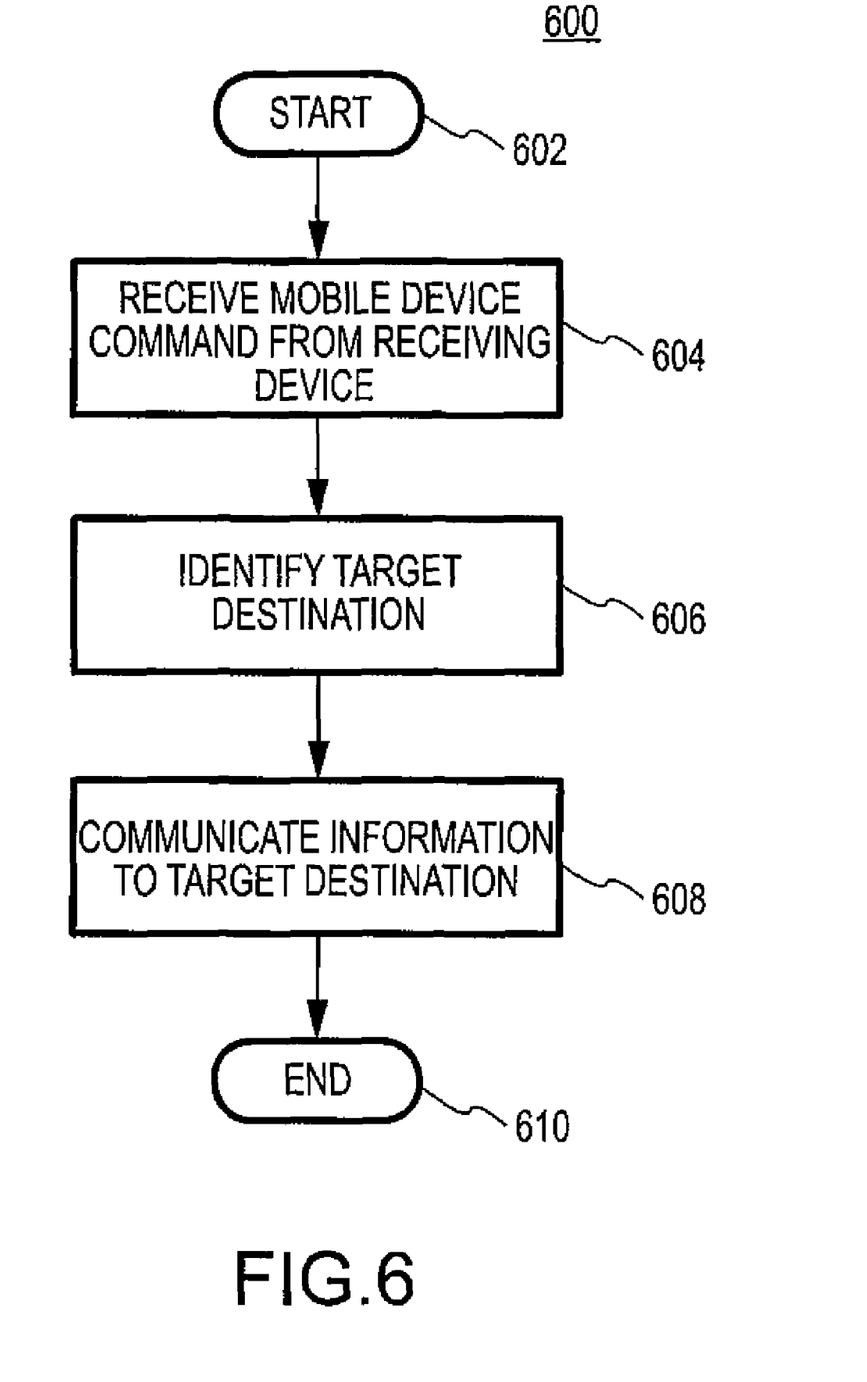
FIG. 6 is a flowchart illustrating a process used by an embodiment of an interactive programming command communicator of a mobile device.

FIGS. 5 and 6 are flowcharts 500 and 600, respectively, illustrating processes that may be used by embodiments of interactive programming command communicators 100a, 100b (FIGS. 3 and 4). In this regard, each described process may represent a module, segment, or portion of code, which comprises one or more executable instructions for implementing the specified logical function(s). It should also be noted that in some implementations, the functions noted in the process may occur in a different order, may include additional functions, may occur concurrently, and/or may be omitted.

With respect to FIG. 5, the process 500 is ongoing with operation of the interactive programming command communicator 100a (FIG. 3) and is illustrated as starting at 502. At 504, a receiving device 118 receives a user command. The user command is from a remote control 128, and the user command is directed to a remote target destination 142 (FIG. 1). At 506, the interactive programming command communicator 100a generates a mobile device command 220 from the received user command. At 508, the mobile device command 220 is communicated to a mobile device 140. The process ends at 510.

With respect to FIG. 6, the process 600 is ongoing with operation of the interactive programming command communicator 100b (FIG. 4) and is illustrated as starting at 602. At 604, a mobile device 140 receives a mobile device command 220 from a receiving device 118. Information in the mobile device command 220 is used to identify a target destination 142 (FIG. 1) at 606. The information from mobile device command 220 is communicated to the target destination 142 at 608. The process ends at 610.

While various embodiments have been described hereinabove, it is to be appreciated that various changes in form and detail may be made without departing from the spirit and scope of the invention(s) presently or hereafter claimed.

The invention claimed is:

1. A method to wirelessly communicate commands with receiving devices, comprising:

receiving a stream of audio/visual programming content with a receiving device;

presenting the stream of audio/visual programming content with a presentation device associated with the receiving device;

receiving with a receiving device a user command from an external source, the user command directed to a remote target destination;

modifying a presentation of the stream of audio/visual programming by at least forwarding or reversing the presentation of the stream;

generating a mobile device command from the received user command, the generating including adding at least one image from the modified stream of audio/visual programming content to the mobile device command, the mobile device command directing a mobile device to delay a further communication of the mobile device command until a different time; and communicating the mobile device command to the mobile device, the mobile device configured to permit a user to electronically send, receive, create, edit, and manage information.

2. The method of claim 1 wherein generating the mobile device command from the received user command comprises:

adding an order to purchase an item from the remote target destination into the mobile device command.

3. The method of claim 1 wherein generating the mobile device command from the received user command comprises:

retrieving personal user information from a memory; and
adding the personal user information into the mobile device command.

4. The method of claim 3, comprising:

adding an order to purchase an item from the remote target destination into the mobile device command to cause delivery of the item ordered; and
based on the personal user information, receiving an invoice corresponding to the item purchased.

5. The method of claim 1 wherein generating the mobile device command from the received user command comprises:

adding a vote into the mobile device command.

6. The method of claim 1 wherein generating the mobile device command from the received user command comprises:

adding a user message into the mobile device command; and
adding an electronic address corresponding to the remote target destination into the mobile device command.

7. The method of claim 6 wherein communicating the mobile device command comprises:

transmitting the mobile device command to the mobile device such that the mobile device communicates the user message to the remote target destination based on the electronic address.

8. The method of claim 6 wherein adding a user message into the mobile device command comprises:

adding text from the user command into the user message; and
adding protocol information into the user message to identify a protocol used to forward the user message to the remote target destination.

9. The method of claim 6 wherein adding a user message into the mobile device command comprises:

adding data corresponding to an image into the user message; and
adding image protocol information into the user message to identify a type of program usable to present the image on a presentation device at the remote target destination.

10. The method of claim 1 wherein receiving the user command from an external source comprises:

receiving the user command from a remote control.

11. A receiving device operable to communicate with mobile devices, comprising:

a programming interface configured to receive a stream of audio/visual programming from a program source;
an output interface configure to present the stream of audio/visual programming to an associated presentation device;
a command receiver configured to receive a user command from an external source;
a processing system operable, upon receiving the user command, to instruct the output interface to modify the presentation of the stream of audio/visual programming by at least forwarding or reversing the presentation of the stream, the processing system further operable to construct a mobile device command directed to a remote target destination and add at least one image or video clip from the modified stream of audio/visual programming to the mobile device command;
a memory configured to pre-store an email address corresponding to the remote target destination, the email address added to the mobile device command at the direction of the user command; and
a mobile device interface configured to communicate the mobile device command to a mobile device, the mobile device configured to permit a user to electronically send, receive, create, edit, and manage information wherein the mobile device is configured to delay further communication of the mobile device command until a different time.

12. The receiving device according to claim 11, further comprising:

a memory to store personal user information, wherein the processing system is further operable to retrieve the personal user information and format the personal user information into the mobile device command.

13. The receiving device according to claim 11 wherein the mobile device interface comprises:

a transmitter configured to communicate to the mobile device a signal having the mobile device command therein.

14. A method to wirelessly communicate commands with receiving devices, comprising:

receiving a stream of audio/visual programming with a receiving device;
presenting the stream of audio/visual programming with a presentation device associated with the receiving device;
receiving with the receiving device a user command from an external source, the user command directed to a remote target destination;
modifying a presentation of the stream of audio/visual programming forwarding or reversing the presentation of the stream;
generating a mobile device command from the received user command, the mobile device command configured to:
  direct a mobile device to identify the remote target destination from first information in the mobile device command,
  direct the mobile device to delay a further communication of the mobile device command until a different time,
  direct the mobile device to communicate second information from the mobile device command to the remote target destination, the second information including a text phrase pre-stored in the receiving device, and
  direct the mobile device to communicate third information from the mobile device command to the remote target destination, the third information including at least one image from the modified stream of audio/ visual programming, wherein the mobile device is configured to permit a user to electronically send, receive, create, edit, and manage information, wherein the mobile device command further directs the mobile device to delay a communication of the mobile device command until a different time; and communicating the mobile device command to the mobile device.

15. The method of claim 14, further comprising:

retrieving personal user information, the personal user information identifying a user associated with the receiving device; and including data representing the personal user information in the second information.

16. The method of claim 15 wherein the personal user information is stored in a memory of the receiving device.

17. The method of claim 14 wherein communicating the mobile device command to the mobile device occurs via a Bluetooth protocol.

18. The method of claim 14 wherein the second information includes an order to purchase from a vendor.

19. The method of claim 14 wherein the second information includes an electronic address and a user message.

* * * * *

UNITED STATES PATENT AND TRADEMARK OFFICE
CERTIFICATE OF CORRECTION

| | |
|---|---|
| PATENT NO. | : 8,369,799 B2 |
| APPLICATION NO. | : 11/924464 |
| DATED | : February 5, 2013 |
| INVENTOR(S) | : Thomas S. Taylor |

It is certified that error appears in the above-identified patent and that said Letters Patent is hereby corrected as shown below:

In the Claims:

Column 16, Line 48:
"programming forwarding or reversing the presentation" should read, --programming by at least forwarding or reversing the presentation--.

Signed and Sealed this
Ninth Day of July, 2013

Teresa Stanek Rea
*Acting Director of the United States Patent and Trademark Office*